United States Patent
Sun et al.

(10) Patent No.: US 9,404,189 B2
(45) Date of Patent: Aug. 2, 2016

(54) HIGH TEMPERATURE CARBON DIOXIDE CORROSION INHIBITOR

(71) Applicants: China National Offshore Oil Corporation, Beijing (CN); China Oilfield Services Limited, Hebei (CN)

(72) Inventors: Yongtao Sun, Tianjin (CN); Zenghua Ma, Tianjin (CN); Huajun Liu, Tianjin (CN); Tong Wang, Tianjin (CN); Tao Lin, Tianjin (CN); Haitao Liu, Tianjin (CN); Shaohua Wang, Tianjin (CN); Yubao Sun, Tianjin (CN)

(73) Assignees: CHINA NATIONAL OFFSHORE OIL CORPORATION, Beijing (CN); CHINA OILFIELD SERVICES LIMITED, Heibei (CN)

( * ) Notice: Subject to any disclaimer, the term of this patent is extended or adjusted under 35 U.S.C. 154(b) by 283 days.

(21) Appl. No.: 14/065,533

(22) Filed: Oct. 29, 2013

(65) Prior Publication Data

US 2015/0069301 A1 Mar. 12, 2015

(30) Foreign Application Priority Data

Sep. 6, 2013 (CN) .......................... 2013 1 0404442

(51) Int. Cl.
| | | |
|---|---|---|
| C09K 8/54 | (2006.01) |
| C23F 11/12 | (2006.01) |
| C23F 11/14 | (2006.01) |
| C23F 11/16 | (2006.01) |
| C23F 11/10 | (2006.01) |

(52) U.S. Cl.
CPC . *C23F 11/10* (2013.01); *C09K 8/54* (2013.01); *C23F 11/122* (2013.01); *C23F 11/145* (2013.01); *C23F 11/149* (2013.01); *C23F 11/161* (2013.01); *C09K 2208/32* (2013.01)

(58) Field of Classification Search
None
See application file for complete search history.

(56) References Cited

U.S. PATENT DOCUMENTS

| | | | | | |
|---|---|---|---|---|---|
| 2,966,458 | A | * | 12/1960 | Counts | C10L 1/2437 252/391 |
| 4,212,764 | A | * | 7/1980 | Quinlan | C23F 11/10 106/14.13 |
| 4,557,838 | A | * | 12/1985 | Nichols | C09K 8/54 252/390 |
| 7,700,533 | B2 | * | 4/2010 | Egbe | C11D 7/3263 510/175 |
| 2010/0176082 | A1 | * | 7/2010 | Cooper | C09K 13/08 216/13 |
| 2011/0028360 | A1 | * | 2/2011 | Jenkins | C02F 5/105 507/256 |
| 2015/0069301 | A1 | | 3/2015 | Sun et al. | |

FOREIGN PATENT DOCUMENTS

| | | |
|---|---|---|
| CN | 101605869 A | 12/2009 |
| CN | 102586782 A | 7/2012 |
| DE | 102007012406 A1 | 9/2008 |

* cited by examiner

*Primary Examiner* — Joseph D Anthony
(74) *Attorney, Agent, or Firm* — Pearne & Gordon LLP

(57) ABSTRACT

The present application relates to a high temperature carbon dioxide corrosion inhibitor comprising the following components by mass percent: amide compound 15~50%, organic alkynol 10~25%, mercaptan acid 5~15%, piperidine 5~25%, mercaptopyridine 5~15%, and solvent 25~60%. The corrosion inhibitor has excellent corrosion inhibition for $CO_2$ corrosion of oil field water system at a high temperature (150~250° C.).

9 Claims, No Drawings

HIGH TEMPERATURE CARBON DIOXIDE CORROSION INHIBITOR

TECHNICAL FIELD

The present invention relates to the field of corrosion inhibitor, and especially relates to a water-soluble corrosion inhibitor applicable for $CO_2$ corrosion in an oil field water system at a high temperature (150~250° C.) and the method for preparing the same.

BACKGROUND OF THE RELATED ART

During the oil and gas exploitation and transportation processes, $CO_2$ is usually present in oil gas as a component of natural gas or oil field gas, or the appearance of other oil recovery techniques, such as $CO_2$ flooding oil recovery technique, air flooding or other oil recovery techniques, produces considerable $CO_2$, such that the metallic conduit and device suffer from severe carbon dioxide corrosion during the exploitation of oil and gas fields, which causes a shortened life span of the device and deterioration of material property, and may easily cause a huge financial loss for the oil and gas fields. In addition, the corrosion will also cause casualties and severe environmental pollution.

The enhancement of the research on corrosion and protection may bring about a tremendous economic benefit for petroleum industry. At present, the protection from carbon dioxide corrosion in the oil and gas fields in our country is generally achieved by the following four methods: selecting an alloy steel with better corrosion resistance, cathodic protection technique, surface coating and injecting corrosion inhibitor. As indicated by the practical experience at home and abroad, among the four types of corrosion control techniques, the method of injecting corrosion inhibitor, as compared with the other protection means, has become a most widely used and practical method in the protection from carbon dioxide corrosion in the oil and gas fields because of numerous advantages including: the disposing process is simple, and is easy to implement; the economic cost is relatively low; and the method can protect all of the materials constituting the device, without the need of additional investment for adding anticorrosive devices (e.g., cathodic protection system).

As to $CO_2$ corrosion in a medium of oil field water with a temperature below 100° C., many work and researches have been done at home and abroad, and many efficient corrosion inhibitors have appeared. However, under the condition of a high temperature up to 150-250° C., most of the existing corrosion inhibitors are inactivated and thus are unable to play a corrosion-inhibiting role.

CONTENT OF THE INVENTION

In view of the problems existing in the prior art, the purpose of the present invention is to provide a high temperature carbon dioxide corrosion inhibitor having excellent corrosion inhibition for $CO_2$ corrosion in an oil field water system at a high temperature (150~250° C.).

The purpose of the present invention is achieved in the following way:

A high temperature carbon dioxide corrosion inhibitor is provided, wherein the corrosion inhibitor comprises the following components by mass percent:

| | |
|---|---|
| amide compound | 15~50% |
| organic alkynol | 10~25% |
| mercaptan acid | 5~15% |
| piperidine | 5~25% |
| mercaptopyridine | 5~15% |
| solvent | 25~60%. |

In a specific embodiment, preferably, the high temperature carbon dioxide corrosion inhibitor comprises the following components by mass percent:

| | |
|---|---|
| amide compound | 20~40% |
| organic alkynol | 15~20% |
| mercaptan acid | 8~12% |
| piperidine | 8~20% |
| mercaptopyridine | 8~12% |
| solvent | 30~50%. |

In a specific embodiment, preferably, the high temperature carbon dioxide corrosion inhibitor consists of components with the following mass percentages:

| | |
|---|---|
| amide compound | 15~50% |
| organic alkynol | 10~25% |
| mercaptan acid | 5~15% |
| piperidine | 5~25% |
| mercaptopyridine | 5~15% |
| solvent | 25~60%. |

In a specific embodiment, the amide compound may be one or two of ethylene bisoleamide and 9-heptadecenyl-N-di(aminoethyl)amide. When the amide compound is a combination of ethylene bisoleamide and 9-heptadecenyl-N-di(aminoethyl)amide, they can be mixed in any ratio.

In a specific embodiment, the organic alkynol may be one or two of propynol and 1,4-butynediol; preferably, the organic alkynol is propynol. When the organic alkynol is a combination of propynol and 1,4-butynediol, they can be mixed in any ratio.

In a specific embodiment, the mercaptan acid may be one or two of mercaptoformic acid and mercaptoacetic acid. When the mercaptan acid is a combination of mercaptoformic acid and mercaptoacetic acid, they can be mixed in any ratio.

In a specific embodiment, the mercaptopyridine may be one or two of 2-mercaptopyridine or 4-mercaptopyridine. When the mercaptopyridine is a combination of 2-mercaptopyridine and 4-mercaptopyridine, they can be mixed in any ratio.

In a specific embodiment, the solvent may be one or two of water and alcohol; preferably, the alcohol is isopropanol.

In a specific embodiment, the contents of the respective components of the high temperature carbon dioxide corrosion inhibitor may be selected as follows:

The mass fraction of the amide compound may be, for example, 16%, 17%, 20%, 30%, 40%, 45%, 49% and so on.

The mass fraction of the organic alkynol may be, for example, 12%, 16%, 18%, 20%, 22%, 24% and so on.

The mass fraction of the mercaptan acid may be, for example, 6%, 7%, 9%, 11%, 13%, 14% and so on.

The mass fraction of the piperidine may be, for example, 6%, 13%, 17%, 19%, 21%, 23% and so on.

The mass fraction of the mercaptopyridine may be, for example, 7%, 8%, 10%, 11%, 12%, 14% and so on.

The mass fraction of the solvent may be, for example, 26%, 27%, 29%, 33%, 39%, 43%, 47%, 49%, 53%, 57% and so on.

The amide compound of the high temperature carbon dioxide corrosion inhibitor of the present invention has multiple adsorbing groups such as N, S, O, etc., which are easy to coordinate with the void atomic orbital(s) of the iron on metallic surface, and meanwhile, the adsorbing groups can be directly adsorbed on the metallic surface and thus plays a corrosion-inhibiting role and increases bonding force. Other compounds also have good adsorbability on the metallic surface. They can fill up the gap between amide on the metallic surface and the metal, and thus play an excellent synergistic effect and enhances the effect of corrosion inhibitor.

The method for preparing the high temperature carbon dioxide corrosion inhibitor of the present invention comprises: weighing the respective components in accordance with the above mass percentages, mixing and stirring until uniform.

As compared with the prior art, the high temperature carbon dioxide corrosion inhibitor of the present invention has the following beneficial technical effects:

(1) the corrosion inhibitor of the present invention can still have high corrosion inhibition when used under the condition of a high temperature up to 150-250° C.;

(2) the high temperature autoclave coupon test on the corrosion inhibitor products prepared in the present invention indicates that the corrosion inhibition efficiencies can all reach above 92% under the condition of a high temperature of 150-250° C.;

(3) the method for the preparation is simple and practicable, has low costs, and is convenient for industrial application.

DETAILED DESCRIPTION OF EMBODIMENTS

The present application will be further described in detail hereinafter by way of examples, such that a person skilled in the art is able to carry out the present application. It should be understood that, other embodiments may be applied, and suitable changes may be made without departing from the spirit or scope of the present application. In order to avoid the details which are unnecessary for a person skilled in the art to carry out the present application, the description may omit certain information that is known by a person skilled in the art. Therefore, the following detailed description should not be appreciated in the sense of limitation, and the scope of the present application is merely defined by the appended claims.

The materials used in the following examples are all commercially available.

Example 1

The respective materials are mixed and stirred in the following ratios so as to obtain high temperature carbon dioxide corrosion inhibitor A:

| | |
|---|---|
| ethylene bisoleamide | 15% |
| propynol | 10% |
| mercaptoformic acid | 6% |
| piperidine | 25% |
| 2-mercaptopyridine | 5% |
| isopropanol | 39% |

Example 2

The respective materials are mixed and stirred in the following ratios so as to obtain high temperature carbon dioxide corrosion inhibitor B:

| | |
|---|---|
| 9-heptadecenyl-N-di(aminoethyl)amide | 15% |
| 1,4-butynediol | 25% |
| mercaptoacetic acid | 15% |
| piperidine | 5% |
| 4-mercaptopyridine | 15% |
| isopropanol | 25% |

Example 3

The respective materials are mixed and stirred in the following ratios so as to obtain high temperature carbon dioxide corrosion inhibitor C:

| | |
|---|---|
| ethylene bisoleamide | 50% |
| propynol | 10% |
| mercaptoacetic acid | 5% |
| piperidine | 5% |
| 2-mercaptopyridine | 5% |
| isopropanol | 20% |
| water | 5% |

Example 4

The respective materials are mixed and stirred in the following ratios so as to obtain high temperature carbon dioxide corrosion inhibitor D:

| | |
|---|---|
| 9-heptadecenyl-N-di(aminoethyl)amide | 15% |
| 1,4-butynediol | 10% |
| mercaptoformic acid | 5% |
| piperidine | 5% |
| 4-mercaptopyridine | 5% |
| isopropanol | 60% |

Example 5

The respective materials are mixed and stirred in the following ratios so as to obtain high temperature carbon dioxide corrosion inhibitor E:

| | |
|---|---|
| 9-heptadecenyl-N-di(aminoethyl)amide | 30% |
| propynol | 15% |
| mercaptoacetic acid | 6% |
| piperidine | 8% |
| 2-mercaptopyridine | 8% |
| isopropanol | 33% |

Example 6

The respective materials are mixed and stirred in the following ratios so as to obtain high temperature carbon dioxide corrosion inhibitor:

| | |
|---|---|
| ethylene bisoleamide | 15% |
| 9-heptadecenyl-N-di(aminoethyl)amide | 15% |
| propynol | 18% |
| mercaptoacetic acid | 11% |
| piperidine | 6% |
| 2-mercaptopyridine | 10% |
| isopropanol | 25% |

Example 7

The respective materials are mixed and stirred in the following ratios so as to obtain high temperature carbon dioxide corrosion inhibitor:

| | |
|---|---|
| ethylene bisoleamide | 18% |
| propynol | 10% |
| 1,4-butynediol | 5% |
| mercaptoformic acid | 12% |
| piperidine | 9% |
| 2-mercaptopyridine | 12% |
| isopropanol | 34% |

Example 8

The respective materials are mixed and stirred in the following ratios so as to obtain high temperature carbon dioxide corrosion inhibitor:

| | |
|---|---|
| 9-heptadecenyl-N-di(aminoethyl)amide | 36% |
| propynol | 10% |
| mercaptoformic acid | 4% |
| mercaptoacetic acid | 4% |
| piperidine | 15% |
| 2-mercaptopyridine | 6% |
| isopropanol | 25% |

Example 9

The respective materials are mixed and stirred in the following ratios so as to obtain high temperature carbon dioxide corrosion inhibitor:

| | |
|---|---|
| 9-heptadecenyl-N-di(aminoethyl)amide | 15% |
| 1,4-butynediol | 20% |
| mercaptoacetic acid | 8% |
| piperidine | 10% |
| 2-mercaptopyridine | 5% |
| 4-mercaptopyridine | 5% |
| isopropanol | 37% |

Example 10

The respective materials are mixed and stirred in the following ratios so as to obtain high temperature carbon dioxide corrosion inhibitor:

| | |
|---|---|
| ethylene bisoleamide | 12% |
| 9-heptadecenyl-N-di(aminoethyl)amide | 15% |
| propynol | 8% |
| 1,4-butynediol | 5% |
| mercaptoformic acid | 9% |
| mercaptoacetic acid | 6% |
| piperidine | 8% |
| 2-mercaptopyridine | 7% |
| 4-mercaptopyridine | 3% |
| isopropanol | 27% |

Testing Example:

For the purpose of detecting the corrosion-inhibiting effect of the high temperature carbon dioxide corrosion inhibitor of the present invention, take the corrosion inhibitor products obtained in the above Examples 1 to 5, and determine the corrosion inhibition efficiencies thereof by the high temperature autoclave coupon testing method (see SY/T5273-2000 "Evaluation Method for Behaviour of Corrosion Inhibitor for Produced Water of Oil Field (油田采出水用缓蚀剂性能评价方法)").

The material used in the experiment is N80 carbon steel; the size of the steel sheet is 50*10*3 mm, rotate speed: 2 m/S, carbon dioxide partial pressure: 2 MPa, the time for testing the coupon: 24 hours, and the ionic concentrations of oilfield wastewater are:

| ION | $K^+ + Na^+$ | $CA^{2+}$ | $Mg^{2+}$ | $OH^-$ | $SO_4^{2-}$ | $Cl^-$ |
|---|---|---|---|---|---|---|
| Concentration (mg/L) | Balance | 8.78 | 2.96 | 14.86 | 23.38 | 83.92 |

Corrosion inhibition efficiency is calculated by the following formula:

Corrosion Inhibition Efficiency (%)=[corrosion rate (blank)−corrosion rate (corrosion inhibitor)]/ corrosion rate (blank)×100%

The test results are shown in the following Table:

| Name | Temperature (° C.) | Concentration of Corrosion Inhibitor (ppm) | Corrosion Rate (mm/a) | Corrosion Inhibition Efficiency (%) |
|---|---|---|---|---|
| Blank | 150 | — | 4.8099 | — |
| A | 150 | 300 | 0.0864 | 98.20% |
| B | 150 | 300 | 0.0899 | 98.13% |
| C | 150 | 300 | 0.0900 | 98.13% |
| D | 150 | 300 | 0.1524 | 96.83% |
| E | 150 | 300 | 0.0795 | 98.35% |
| Blank | 200 | — | 5.4327 | — |
| A | 200 | 300 | 0.1640 | 96.98% |
| B | 200 | 300 | 0.2259 | 95.84% |
| C | 200 | 300 | 0.1895 | 96.51% |
| D | 200 | 300 | 0.2345 | 95.68% |
| E | 200 | 300 | 0.1598 | 97.06% |
| Blank | 250 | — | 2.2333 | — |
| A | 250 | 300 | 0.1103 | 95.06% |
| B | 250 | 300 | 0.1421 | 93.64% |
| C | 250 | 300 | 0.1200 | 94.63% |
| D | 250 | 300 | 0.1620 | 92.75% |
| E | 250 | 300 | 0.1005 | 95.50% |

As can be seen from the above Table, the corrosion inhibition efficiencies of the five corrosion inhibitor products prepared in the Examples of the present application are all high, which are all above 92%, therefore, it is indicated that the corrosion inhibitors of the present invention have excellent corrosion inhibition for $CO_2$ corrosion in an oil field water system at a high temperature (150~250° C.).

In conclusion, the above examples are merely preferred examples of the present application, and are not intended to limit the protection scope of the present application; therefore, any amendments, equivalent substitutions and improvements made within the spirit and principle of the present application shall fall within the protection scope of the present application.

What is claimed is:

1. A high temperature carbon dioxide corrosion inhibitor, characterized in that the corrosion inhibitor comprises the following components by mass percent:

| | |
|---|---|
| amide compound | 15~50% |
| organic alkynol | 10~25% |

| | |
|---|---|
| mercaptan acid | 5~15% |
| piperidine | 5~25% |
| mercaptopyridine | 5~15%, and |
| solvent | 25~60%; | wherein the amide compound includes ethylene bisoleamide, 9-heptadecenyl-N-di(aminoethyl)amide, or a combination thereof;

wherein the organic alkynol includes propynol, 1,4-butynediol, or a combination thereof;

wherein the mercaptan acid includes mercaptoformic acid, mercaptoacetic acid, or a combination thereof;

wherein the mercaptopyridine includes 2-mercaptopyridine, 4-mercaptopyridine, or a combination thereof; and wherein the solvent includes water, an alcohol, or a combination thereof.

2. The high temperature carbon dioxide corrosion inhibitor of claim 1, wherein the mass percentages of the components are as follows:

| | |
|---|---|
| amide compound | 20~40% |
| organic alkynol | 15~20% |
| mercaptan acid | 8~12% |
| piperidine | 8~20% |
| mercaptopyridine | 8~12%, and |
| solvent | 30~50%. |

3. A high temperature carbon dioxide corrosion inhibitor, characterized in that the corrosion inhibitor consists of components with the following mass percentages:

| | |
|---|---|
| amide compound | 15~50% |
| organic alkynol | 10~25% |
| mercaptan acid | 5~15% |
| piperidine | 5~25% |
| mercaptopyridine | 5~15%, and |
| solvent | 25~60%; | wherein the amide compound includes ethylene bisoleamide, 9-heptadecenyl-N-di(aminoethyl)amide, or a combination thereof;

wherein the organic alkynol includes propynol, 1,4-butynediol, or a combination thereof;

wherein the mercaptan acid includes mercaptoformic acid, mercaptoacetic acid, or a combination thereof;

wherein the mercaptopyridine includes 2-mercaptopyridine, 4-mercaptopyridine, or a combination thereof; and wherein the solvent includes water, an alcohol, or a combination thereof.

4. The high temperature carbon dioxide corrosion inhibitor of claim 1, wherein the organic alkynol is propynol.

5. The high temperature carbon dioxide corrosion inhibitor of claim 3, wherein the organic alkynol is propynol.

6. The high temperature carbon dioxide corrosion inhibitor of claim 1, wherein the solvent is isopropanol.

7. The high temperature carbon dioxide corrosion inhibitor of claim 3, wherein the solvent is isopropanol.

8. The high temperature carbon dioxide corrosion inhibitor of claim 1, wherein the organic alkynol is propynol and the solvent is isopropanol.

9. The high temperature carbon dioxide corrosion inhibitor of claim 3, wherein the organic alkynol is propynol and the solvent is isopropanol.

\* \* \* \* \*